United States Patent [19]

Hopper et al.

[11] 4,270,516
[45] Jun. 2, 1981

[54] SOLAR ENERGY COLLECTOR

[75] Inventors: Thomas P. Hopper, Durham; Everett M. Barber, Jr., Guilford, both of Conn.

[73] Assignee: Sunworks, Inc., Guilford, Conn.

[21] Appl. No.: 854,153

[22] Filed: Nov. 23, 1977

[51] Int. Cl.³ ............................................. F24J 3/02
[52] U.S. Cl. ................................. 126/417; 126/449; 126/444; 126/429; 165/48 S
[58] Field of Search ............... 126/270, 271, 444, 445, 126/446, 449, 417, 429; 165/79, 133, 170, 185, 165–167, 48 S; 29/157.3 D, 157.3 C; 138/143, 146, DIG. 6, DIG. 7; 252/63, 63.7

[56] References Cited

U.S. PATENT DOCUMENTS

| 2,360,123 | 10/1944 | Gerstung et al. | 165/166 X |
| 2,970,181 | 1/1961 | Corren | 156/300 X |
| 3,376,684 | 4/1968 | Cole et al. | 52/670 X |
| 3,632,362 | 1/1972 | Urushiyama et al. | 252/63 X |
| 3,666,006 | 5/1972 | Valyi | 165/133 X |
| 3,946,892 | 3/1976 | Rigal et al. | 126/270 |
| 3,963,632 | 6/1976 | Tanaka | 252/63.2 X |
| 4,016,861 | 4/1977 | Taylor | 126/270 |
| 4,023,557 | 5/1977 | Thorne | 165/133 |
| 4,068,652 | 1/1978 | Worthington | 126/270 |
| 4,072,142 | 2/1978 | Lof | 126/270 |
| 4,084,578 | 4/1978 | Ishibashi | 126/270 |
| 4,089,324 | 5/1978 | Tjaden | 165/133 |
| 4,123,883 | 11/1978 | Barber, Jr. et al. | 237/1 A |
| 4,141,338 | 2/1979 | Lof | 126/270 |

FOREIGN PATENT DOCUMENTS 2337319  7/1977  France ..................................... 126/271

Primary Examiner—James C. Yeung
Assistant Examiner—Larry Jones
Attorney, Agent, or Firm—DeLio and Montgomery

[57] ABSTRACT

A solar energy collector of the air heat exchange type in which the absorber forms the upper wall of an air duct and a heat exchanger in the duct transfers heat from the absorber to air in the duct, thereby providing increased heated surface area to the air passing therethrough.

6 Claims, 17 Drawing Figures

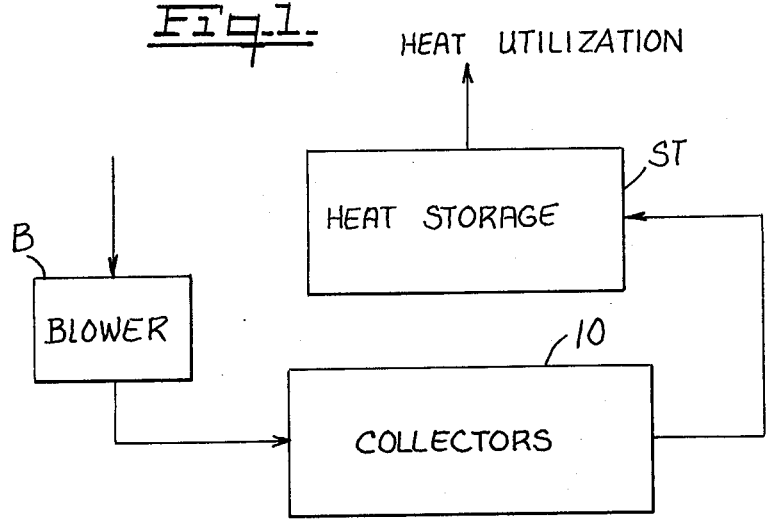
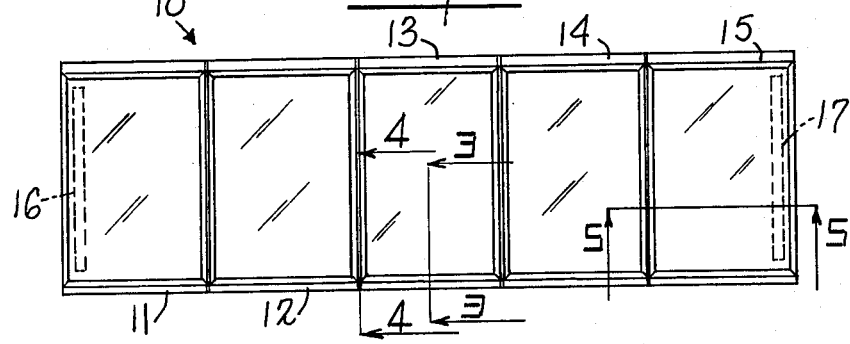
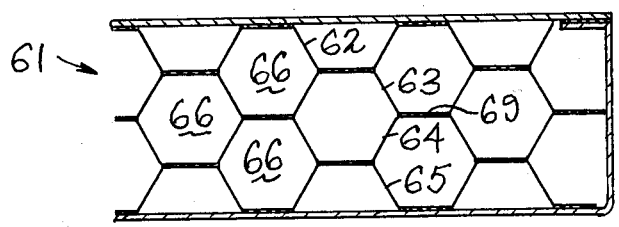
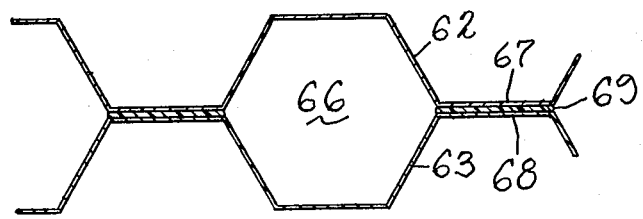

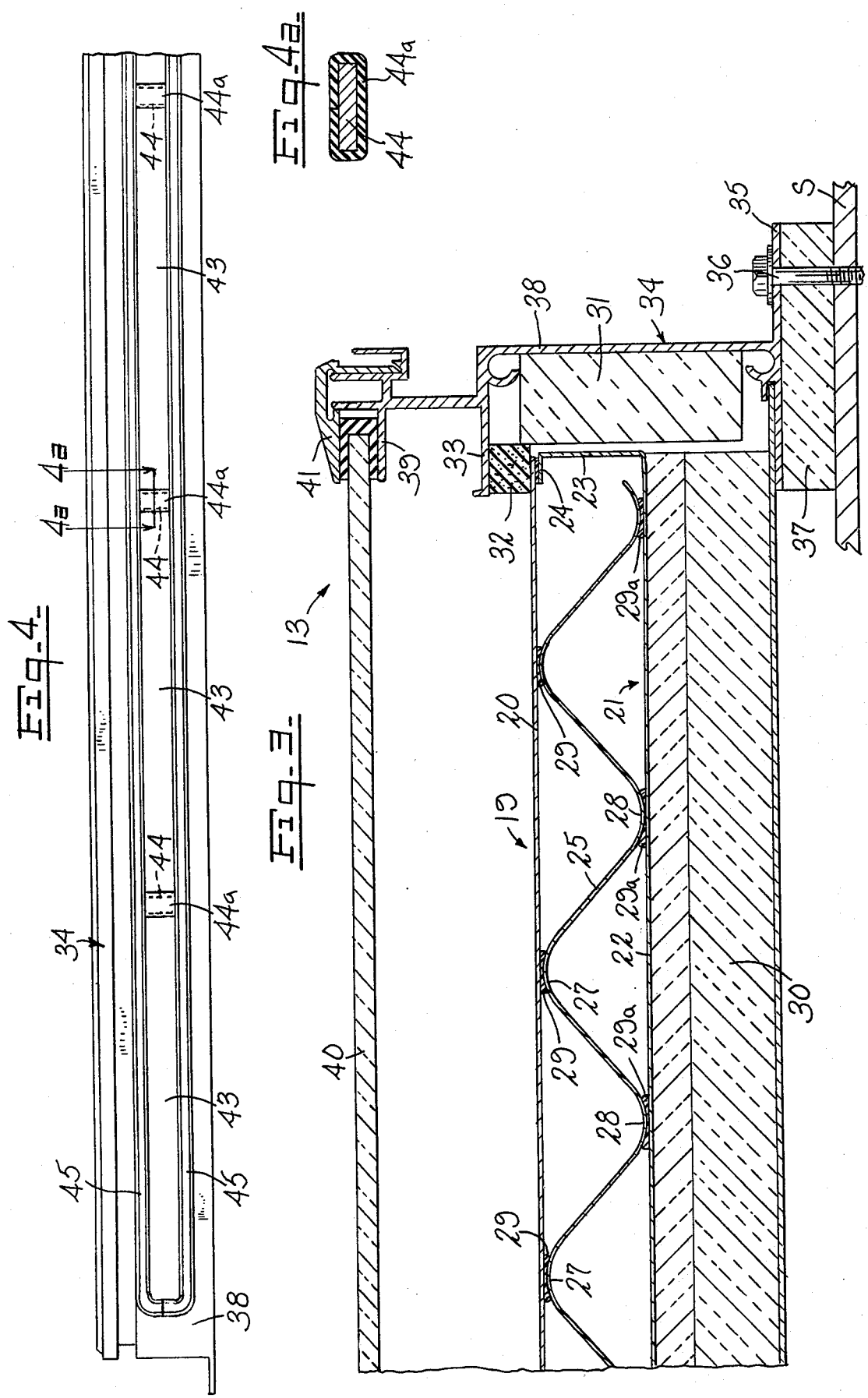

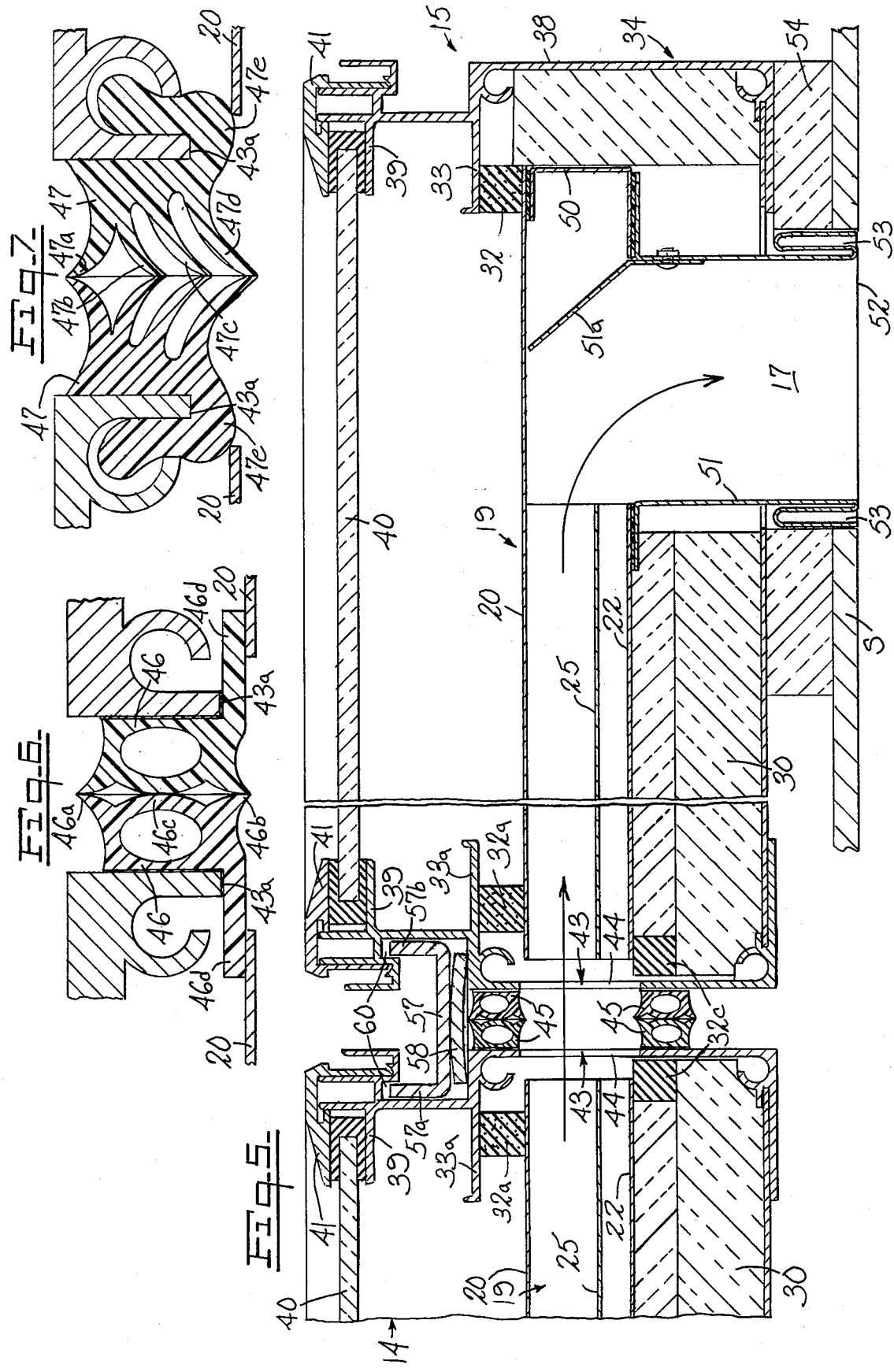

SOLAR ENERGY COLLECTOR

This invention relates to solar collectors and more particularly relates to solar collectors of the type utilizing air as a heat exchange medium.

Solar energy collectors of the type utilized for heating may be broadly classified into two types, one of which uses liquid as a heat exchange medium to receive heat from an absorber and then conveny the heat to a storage and/or distribution area; the other type utilizes air which is passed over a surface of the absorber to accept heat therefrom and convey the heated air to a storage and/or distribution area.

In the air type collector, problems may be presented by the recirculation of air from the interior of the structure through the collector, in that dust picked up by the moving air may be deposited on that surface of the absorber panel and on the underside of the glass cover of the collector, resulting in a decrease in thermal efficiency of the collector. Additionally, the air in passing along the surface of an absorber panel or a duct including the absorber is only heated in the layer immediately adjacent the absorber or duct walls. Thus, the air is not able to accept all the available sun's heat generated at the absorber.

The present invention provides a new and improved solar collector of the air exchange type in which the absorber panel is formed as a portion of a duct within the collector housing and the air passes through such duct contacting the underside of the absorber and thus does not deposit any dust or other foreign particles on the side of the absorber exposed to solar radiation. Heat conducting and exchanging means are provided within the duct repeatedly contacting the bottom of the duct and the underside of the absorber panel to effect efficient heat transfer from the absorber to such conducting means and to the walls of the duct, whereby the heat generated at the absorber is efficiently transferred to a much larger surface area. This increases the heated surfaces contacted by the air passing through the duct which increases the rate of heat transfer from the absorber to the air stream and thereby increases the thermal efficiency of the collector.

An object of this invention is to provide a new and improved solar collector of the air heat transfer type.

Another object of this invention is to provide a solar collector of the air heat transfer type wherein the absorber panel is defined on a duct through which the air passes, and new and improved heat transfer means are provided in the duct.

The features of the invention which are believed to be novel are particularly pointed out and distinctly claimed in the concluding portion of this specification. The invention, however, both as to its organization and operation may best be appreciated by reference to the following detailed description taken in conjunction with the drawings, wherein:

FIG. 1 is a schematic diagram of the major components of a solar energy heating system in one mode of operation;

FIG. 2 is a plan view of an array of collectors of an air heat exchange type;

FIG. 3 is a sectional view seen in the plane of lines 3—3 of FIG. 2;

FIG. 4 is a view seen in the plane of lines 4—4 of FIG. 2;

FIG. 4a is a sectional view seen in the plane of lines 4a—4a of FIG. 4;

FIG. 5 is a view seen in the plane of lines 5—5 of FIG. 2;

FIG. 6 is an enlarged view of a portion of FIG. 5 showing an alternate sealing arrangement;

FIG. 7 is a view in section similar to FIG. 6 showing another form of sealing arrangement;

FIG. 8 is a sectional view of a collector duct similar to FIG. 3 showing another heat exchanger embodiment;

FIG. 9 is an enlarged view of a portion of FIG. 8;

Figure 10:
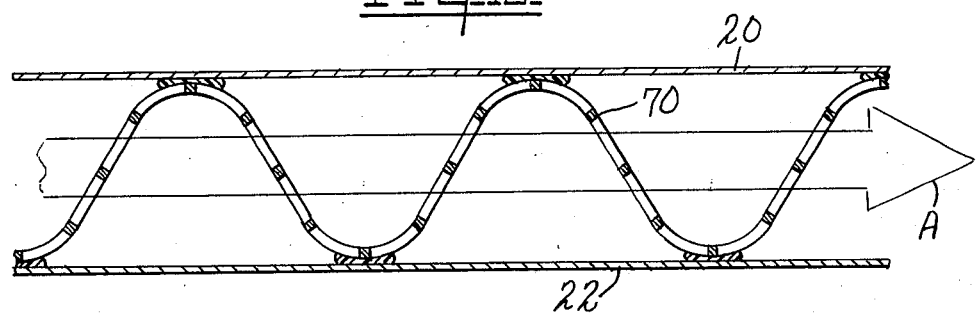
FIG. 10 is a sectional view along the length of an absorber showing another type of heat exchanger.

A solar energy heating system of the air heat exchange type is exemplified in FIG. 1 and comprises a collector array 10 through which air is circulated by a blower B to a heat storage device ST and to the interior of a structure. Only one mode of operation of the system is shown, in which air is drawn from the structure to the collector system by the blower and hence to storage. Heat is transferred from the storage system for utilization by any suitable means.

The collector array 10 is mounted to a structure S, FIG. 3, and is exemplified by a series of collectors 11-15 (FIG. 2). The collector array is mounted at an angle from the horizontal to receive maximum benefit of solar radiation at the latitude of installation.

The end collectors 11 and 15 have bottom openings 16 and 17, respectively, as hereinafter described through which air is circulated through the collector system.

The housings of the collectors as shown in FIG. 3 may be of the type disclosed and claimed in co-pending U.S. Application Ser. No. 772,971, filed Feb. 28, 1977, now U.S. Pat. No. 4,123,883, the disclosure of which is incorporated by reference, and will not be described in detail.

A sectional view of collector 13 is shown in FIG. 3. Collector 13 and the other collectors include within a rectangular housing an absorber assembly 19 in the form of a duct of rectangular cross-section. The upper wall of the duct is an absorber 20 which may have a selective surface thereon. The absorber 20 is joined to a member 21 having a bottom wall 22 and upstanding side walls 23 with a turned over flange 24 which is bonded in good heat transfer relation to the underside of absorber 20 continuously through its length with a bonding agent of good thermal conductivity. A suitable bonding agent is an epoxy known as Ecco-Bond 281, marketed by Emerson and Cummings, Inc. of Canton, Massachusetts or 3M 2214. Such bonding agents have high thermal conductivity. These bonding agents also are dielectrics, which characteristic meets requirements hereinafter specified. Disposed within duct 19 is a heat transfer member 25 shown as being corrugated and having upper 27 and lower 28 ridges which alternately contact the underside of absorber 20 and the bottom 22 of the duct. The bonding agent, as shown, fills an area of contact between the ridges much greater than would be the direct contact area of the ridges on the duct. This enhances transfer of heat from absorber 20 to member 25.

Member 25 serves several functions. It rigidizes the duct construction. It transfers heat to the bottom 22 of the duct, it radiates heat into the passages defined thereby, and it gives up heat by contact to the air scrubbing thereon.

The ridges 27 and 28 of heat transfer member 25 are bonded essentially continuously throughout their lengths to the underside of absorber 20, and to the bottom 22 of the duct by a bonding agent of the type heretofore described. This establishes a large area for heat transfer between member 25, absorber 20 and bottom wall 22. Such areas of bonding contact are indicated at 29 to the absorber and at 29a to the bottom wall 22. Member 25 may take other forms as hereinafter disclosed, but generally speaking it is of repetitive, substantially symmetrical configuration across the width of the interior of a duct 19 and provides a heat transfer path from the absorber to bottom wall 22. The surfaces of heat transfer member 25 may be roughened or otherwise made with a non-smooth surface to enhance the scrubbing action of the air passing thereover, and increase the heat exchange efficiency.

Heat transfer member 25 defines with absorber 20 and the member 21 a multiplicity of individual passages through which air passes. The multiplicity of passages maximizes heated surface contact with the air and enhances transfer of heat to the air. For most efficient heat transfer, the bond between the ridges of member 25 should be continuous wherever the heat transfer member comes in contact with or is in close proximity to absorber 20 or bottom wall 22. The continuous bonds permit substantially uniform heat transfer from the absorber and prevents hot spots which might occur if the points of contact were only intermittent, such as might occur with mechanical fasteners.

The duct 19 may be formed of dissimilar metals such as a copper absorber and aluminum heat exchanger and bottom wall, and in the case of the end collectors, galvanized steel or other non-corrosive inlet and outlet ducts. The dielectric properties of the bonding agents previously mentioned prevents electrolysis between the dissimilar metals in each case.

Within the housing, the duct 19 rests on a bed of one or more layers of insulation 30. Additionally, lengths of insulation 31 space and insulate the duct from the collector housing. An upper length of thermal insulation 32, preferably of a compressible closed cell material, forms an essentially airtight seal at the edge of duct 19 and spaces the duct from a condensation trough 33. A similar seal 32a forms an airtight seal between the trough 33a above openings 43 and absorber 20 (FIG. 5). A lower seal 32c is provided beneath the edge of duct 19 at opening 43.

The collector housings 34 may be formed with flanges 35 extending outwardly from the top and bottom, and fasteners such as bolts or screws 36 tie the housings to a structure S. The collectors may be mounted on shimming members 37 to permit air circulation between the collectors and the structure S. The collector housings further comprise an upstanding wall 38 including a support ledge 39 for a transparent cover member 40, and a cap member 41.

The sides of the collectors as exemplified in FIG. 4 have an opening or a plurality of openings 43 defined therein in communication with the ducts 19. The small struts 44 between the openings 43 are left in the housing wall only for purposes of rigidity of the housing. A seal 45 is provided around all of openings 43 for reasons hereinafter described. The struts 44 are also preferably thermally insulated, as by example with a piece of split insulating tubing 44a wrapped there around as shown in FIG. 4a. Alternatively, the struts could be wrapped with a thermal insulating tape.

Reference is now made to FIG. 5 which is a section through end collector 15. Duct 19 in collector 15 is closed at its end by a member 50. A transition duct 51 is coupled to the bottom wall 22 of duct 19 together with a deflector 51a to direct the air passing through the collectors and into collector 15 to exit at the bottom, previously identified as opening 17. Duct 51 is bonded to the underside of duct 19 and is formed at its bottom edge 52 with recesses 53. Recesses 53 are formed to receive the straight walls of a connecting duct (not shown) which extends into the structure S. The lower portion of transition duct 51 is surrounded by a closed cell insulating and sealing material 54. The transition duct is dimensioned to fit between adjacent joists of the structure S.

The transition duct 51 will generally be of galvanized sheet metal or other corrosion resistant sheet stock and therefore the bonding agent has the same dielectric characteristics as previously mentioned.

Adjacent collectors are so positioned that the seals 45 are in compressive contact. The seals are preferably of a closed cellular material and so formed as to ensure no escape of air from the housing at the joints and further to prevent any ingress of ambient air.

The seals 45 are shown in enlarged proportion in a slightly modified form 46 in FIG. 6. Mating seals have three areas of contact along the lengths thereof. The upper tips 46a of the seals will be forced into tighter sealing engagement if the pressure of the air outside of the housings should be greater than the pressure of the air moving through the ducts 19. If the conditions should be reversed, the lower tips 46b will then be pressed inwardly to effect sealing contact. At all times, all three areas are in contact, especially the mid-portions 46c of the seals. The seals 45 and 46 are applied to the walls of the housing with a suitable adhesive. The seals 46 differ only from the seals 45 in the provision of a flange 46d which extends inwardly through openings 43 and contact the upper and lower surfaces of duct 19. This arrangement insulates the edges 43a about openings 43 and prevents loss of heat to the collector housings.

In FIG. 7, another form of seal 47 is shown, having a mechanical interlock about the edges 43a of the collector housing defining the openings 43. The seals 47 have a multiplicity of fingers 47a-47d in compressive contact. The fingers 47a are urged into tighter engagement if the ambient pressure is greater than the pressure within the sealing fingers. Similarly, the fingers 47d are urged into tighter engagement if the ambient pressure is less than the pressure within the sealing fingers.

The portions 47e of seals 47 insulate the edges 43a of the housing which might otherwise be heated by air as it passes from the duct 19 of one housing into the duct 19 of another housing.

The seals 45 and 46 are preferably of a closed cell resilient material. If solid in cross-section, as shown in FIG. 7, the seals are chosen to be very soft to ensure compressibility and good sealing engagement.

To further ensure an airtight seal, a sealant such as a silicone gel may be applied between contacting surfaces of adjacent seals to fill any irregularities in the surfaces of the seal which might define small air passages.

The adjacent collector housings are maintained in parallel spaced arrangement with the seals 45 compressively engaged by means of a connecting member in the form of a U-shaped channel member 57 having ends 57a and 57b which are received in bottom opening channels 60 defined in the collector housings. In assembly, the adjacent collectors are positioned with one or more members 57 therebetween and aligned by the upstanding legs 57a and 57b. Then a shimming member 58 is inserted under each member 57, raising the legs 57a and 57b up into the passages 60. If continuous, member 57 also serves as a covering above the junction of the collectors. Otherwise, the space between the collectors may be covered by flashing, as disclosed in said Application Ser. No. 772,971.

The described construction provides a solar collector system of the air exchange type where the duct is completely insulated from the frame. Thus, there is little or no loss of thermal energy from the heated air to the collector frames.

FIGS. 8 and 9 show another type of heat transfer member within duct 19, which heat transfer member 61 may be termed a honeycomb. This honeycomb is formed of layers 62-65 of thin gauge sheet material of good thermal conductivity, such as aluminum, which are stacked to form a multiplicity of air passages 66. As shown, the passages formed by the layers are generally hexagonal but may take any other cross-section. The layers 62-65 are formed with flat portions 67 and 68 in substantially parallel planes. Then the flats of adjacent layers are bonded together as indicated at 69. The layers may be of very thin metal but the resulting honeycomb will be structurally stiff upon bonding. The outer flat portions of layers 62 and 65 are bonded substantially throughout their length to absorber 20 and the bottom duct wall 22, respectively, in good heat exchange relationship. With this arrangement, the material defining the honeycombs will conduct heat from the absorber therethrough and to the bottom and side walls of duct 19. The air passing through the passages 66 will receive heat radiated from the honeycomb as well as scrub the lengths thereof, and receive heat from such scrubbing action. Such scrubbing action of the air also occurs on the underside of the absorber 20, bottom wall 22, and at the side walls. Scrubbing may be further improved if all surfaces defining passages 66 were textured and designed to cause greater turbulence. It will be apparent that the heat transfer member 25 could be made in the form of one of the layers 62-65.

In an alternate form, the planar absorber could be eliminated and the upper surfaces of the first honeycomb 62 form the absorber. In such case, layer 62 would preferably receive a selective surface.

Figure 11:
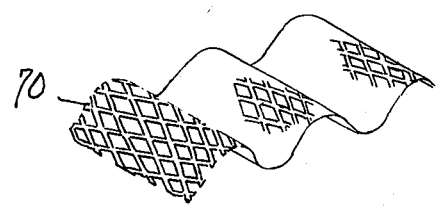
FIG. 11 is an isometric view of the heat exchanger of FIG. 10.

Still another type heat transfer member 70 is shown in FIGS. 10 and 11. In this embodiment, the heat transfer member is arranged in corrugated form and is of a construction known as expanded or punched metal, as more clearly shown in FIG. 11. The direction, arrow A, of the air through the duct 19 is transverse to the direction of bond of the heat transfer member to the absorber 20 and duct bottom wall 22. In this arrangement, an efficient scrubbing action of the air on the heat transfer member occurs while passing through the openings in the expanded metal.

Figure 12:
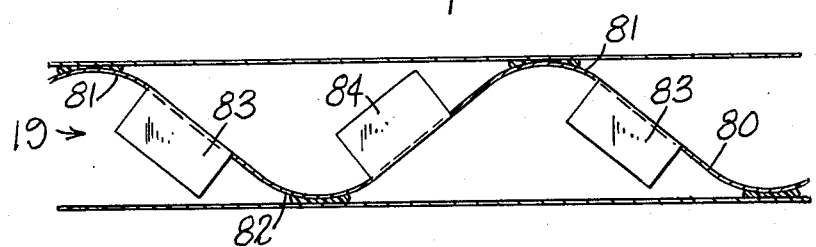
FIG. 12 is a sectional view, along the length of an absorber showing another form of heat exchanger.
Figure 13:
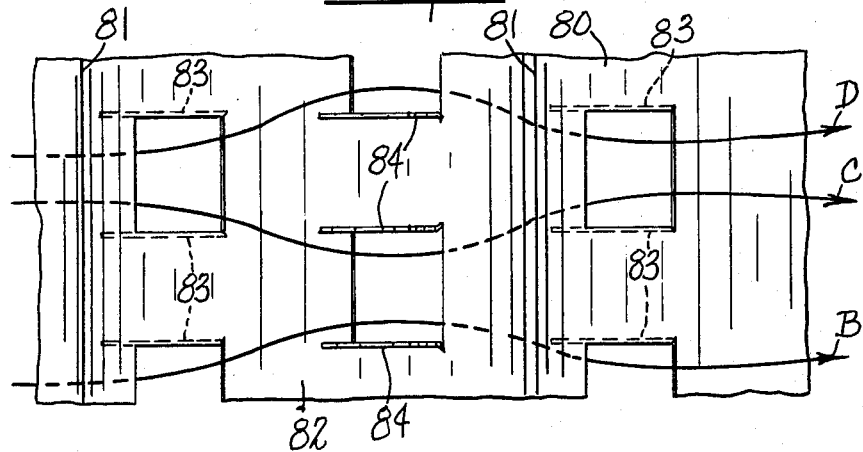
FIG. 13 is a top plan view of the absorber shown in FIG. 12.

FIGS. 12 and 13 illustrate still another heat transfer member 80 which may be utilized in a collector embodying the invention. The heat transfer member 80 is generally formed in the same manner as exchanger 25 but the ridges 81 and 82 thereof are bonded transverse to the direction of air flow through duct 19. A plurality of openings are struck from the sheet between the ridges 81 and 82. The tabs 83 and 84 from such openings extend in the direction of air flow. The air flow will therefore be slightly tortuous as indicated by the arrows B, C and D in FIG. 13, and will scrub the tabs and the walls between the ridges 81 and 82.

The various heat exchangers have been described as being "corrugated". The term "corrugated" as used herein refers to the heat exchanger being formed to repeatedly contact directly and/or through the bond the absorber and bottom duct wall at contiguous areas along a dimension of the duct.

When the metals joined at the bonding areas are dissimilar, the bonding agent provides a dielectric spacing. Such spacing is not necessary where the joined metals are similar. An example of a bond uses a continuous bead of thermally conductive epoxy about 3/32" in diameter which is roller applied or dispensed on the ridges. Then when the heat transfer member is placed in member 21, and absorber 20 applied, the bonding agent will spread out as shown in the drawings to provide a plurality of continuous areas for heat exchange. The bonding agent is then cured while the parts are kept in close relation. Where the heat transfer member is the same material as the absorber and/or the duct, the bonding may be by means of welding.

Figure 14:
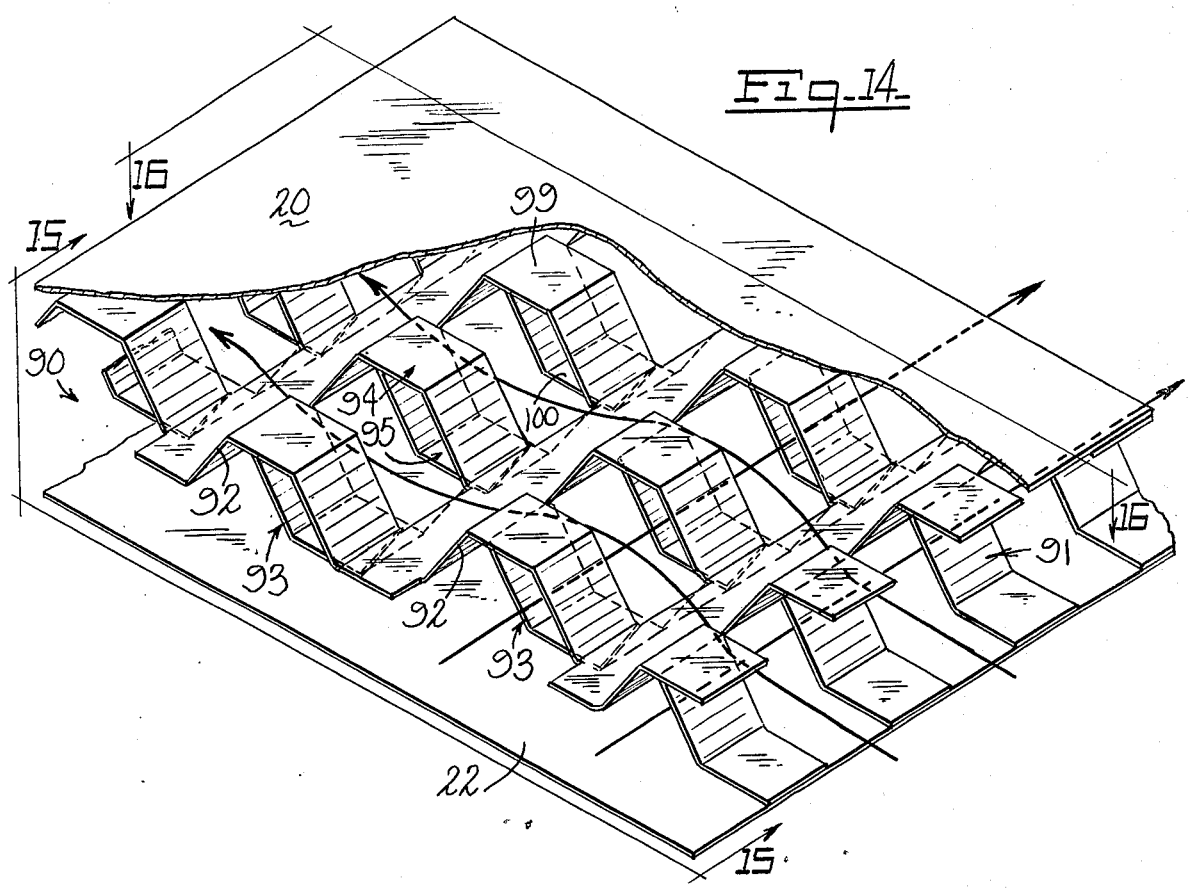
FIG. 14 is a partial isometric view of another collector duct arrangement.

Another form of heat transfer member may take the form of double reverse corrugated sheet material similar to that described in U.S. Pat. No. 3,376,684. A section of a duct 90 embodying this invention and using such double reverse corrugations is shown in FIG. 14 with a portion of the absorber 20 removed. The upper flat areas are bonded to the underside of the absorber, and the lower flat areas are bonded to the bottom wall of the duct.

The heat exchanger member 91 of the duct 90 comprises a sheet of heat conductive material formed with a plurality of rows of upper corrugations 92 and a plurality of rows of lower corrugations 93 extending from the original plane of the sheet. The upper corrugations and the lower corrugations are interrupted to form a plurality of upper and lower elements 94 and 95, respectively, in each row.

Figure 15:
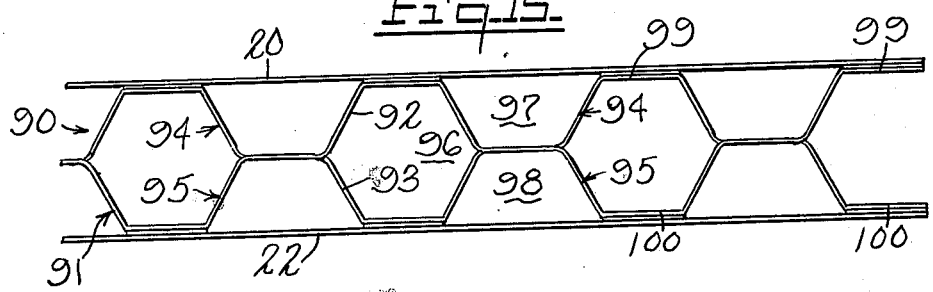
FIG. 15 is a view seen in the plane of lines 15—15 of FIG. 14.
Figure 16:
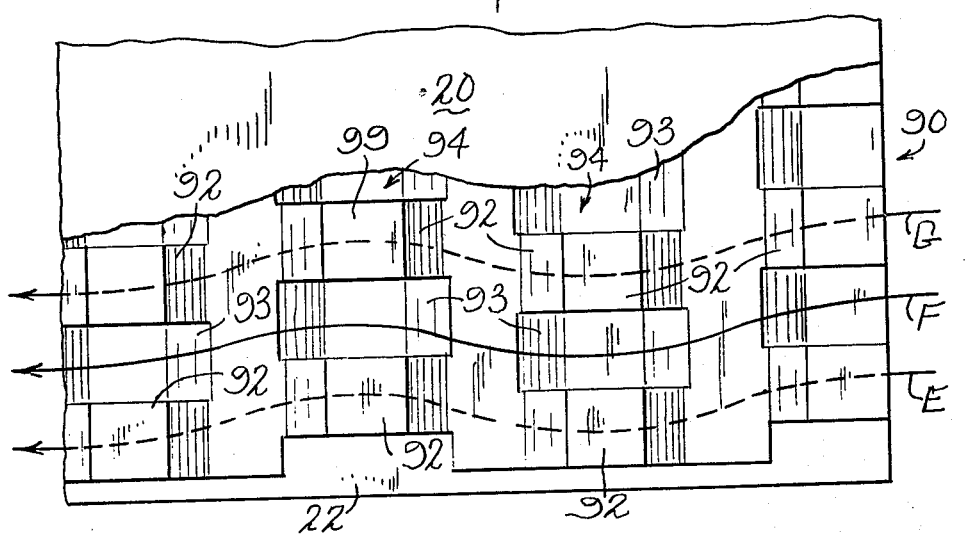
FIG. 16 is a view seen in the plane of lines 16—16 of FIG. 14 with the absorber partially removed.

The assembly 90 may be utilized for air flow therethrough in either direction. The air may pass through substantially independent (but communicating) channels 96, 97 and 98, as seen in FIG. 15, or may move in more tortuous paths as exemplified in FIG. 16. The offsetting of the rows of corrugations as shown in FIG. 16 provides greater turbulence for the air to scrub the heat transfer member. The upper 99 and lower 100 apices of the individual elements 94 and 95 are preferably formed as flats to permit a greater area of bond and also more uniform transfer of heat to the heat transfer member from the absorber, and hence the bottom of the duct.

As shown more clearly in FIG. 16, the elements 94 of adjacent upper rows are offset with respect to the elements 94 of the next row to form a somewhat tortuous air flow path in the direction indicated by the arrows E, F and G.

The heat exchanger member may be formed in other configurations with heat transfer elements struck from a single sheet in one or both directions to provide heat transfer to the bottom of the duct from the absorber, scrubbing surfaces, and also surfaces for bonding to the surface and bottom wall. For example, a multiplicity of L-shaped elements may be struck and extend from a base sheet which is bonded to the absorber and the bottom leg of the "L" bonded to the bottom wall of the duct, or vice versa. Such elements may be in various orientations to the direction of air flow to provide a good heat radiation pattern, and surfaces for scrubbing.

It may thus be seen that the objects of the invention set forth as well as those made apparent from the foregoing description are efficiently attained. While preferred embodiments of the invention have been set forth for purposes of disclosure, modifications to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A solar energy collector of the air heat exchange type comprising a rectangular housing, an absorber assembly within said housing, said absorber assembly comprising an upper wall, side walls and a bottom wall defining a closed duct through said housing, means thermally insulating said duct from said housing, openings defined in said housing at the ends of said duct, said upper wall comprising an absorber panel, a heat transfer member having high and low areas repeatedly extending between said upper and lower walls, and means bonding said heat transfer means to said absorber at said high areas and to said lower wall at said low areas to establish heat transfer paths from said top wall to said bottom wall, said heat transfer means being effective to transfer heat to air passing through said duct, said heat transfer means being in the form of a honeycomb defining a multiplicity of air passages through said duct.

2. A solar energy collector of the air heat exchange type comprising a rectangular housing, an absorber assembly within said housing, said absorber assembly comprising an upper wall, side walls and a bottom wall defining a closed duct through said housing, means thermally insulating said duct from said housing, openings defined in said housing at the ends of said duct, said upper wall comprising an absorber panel, a heat transfer member having high and low areas repeatedly extending between said upper and lower walls, and means bonding said heat transfer means to said absorber at said high areas and to said lower wall at said low areas to establish heat transfer paths from said top wall to said bottom wall, said heat transfer means being effective to transfer heat to air passing through said duct, said heat transfer means being in the form of a corrugated sheet with upper and lower ridges thereof bonded to said absorber, said ridges being disposed transverse to the direction of air flow through said duct, said sheet having a plurality of openings defined therein between said ridges with a tab from said openings extending in the direction of air flow through said duct.

3. A solar energy collector of the air heat exchange type comprising a rectangular housing, an absorber assembly within said housing, said absorber assembly comprising an upper wall, side walls and a bottom wall defining a closed duct through said housing, means thermally insulating said duct from said housing, openings defined in said housing at the ends of said duct, said upper wall comprising an absorber panel, a heat transfer member having high and low areas repeatedly extending between said upper and lower walls, and means bonding said heat transfer means to said absorber at said high areas and to said lower wall at said low areas to establish heat transfer paths from said top wall to said bottom wall, said heat transfer means being effective to transfer heat to air passing through said duct, said heat transfer means being formed with upper and lower rows of corrugations struck from the plane of a sheet, said rows of corrugations being interrupted to form individual corrugation elements along a row, each of said elements having a surface bonded to one of said absorber and said bottom wall.

4. The collector of claim 3 wherein said corrugation elements of each row are offset with respect to the corrugation elements of the adjacent row on each side of said plane.

5. The collector of claim 3 wherein said elements are trapezoidal in shape and the surface defining the smaller parallel surface of the trapezoidal shape is bonded.

6. The collector of claim 3 wherein the direction of air flow through said duct is substantially perpendicular to said rows.

* * * * *